United States Patent
Benjamin-Deckert et al.

(10) Patent No.: US 9,672,220 B2
(45) Date of Patent: *Jun. 6, 2017

(54) INDEX RECORD-LEVEL LOCKING FOR RECORD-ORIENTED FILE SYSTEMS

(71) Applicant: International Business Machines Corporation, Armonk, NY (US)

(72) Inventors: Debra J. Benjamin-Deckert, San Jose, CA (US); Lawrence L. T. Law, Saratoga, CA (US); Terri A. Menendez, Richmond, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,163

(22) Filed: May 9, 2016

(65) Prior Publication Data
US 2016/0253353 A1 Sep. 1, 2016

Related U.S. Application Data

(63) Continuation of application No. 13/842,356, filed on Mar. 15, 2013, now Pat. No. 9,361,332.

(51) Int. Cl.
*G06F 17/30* (2006.01)

(52) U.S. Cl.
CPC .. *G06F 17/30171* (2013.01); *G06F 17/30091* (2013.01); *G06F 17/30138* (2013.01); *G06F 17/30327* (2013.01); *G06F 17/30371* (2013.01)

(58) Field of Classification Search
CPC ......... G06F 17/30327; G06F 17/30067; G06F 17/30091; G06F 17/30371; G06F 17/30171; G06F 17/30138

USPC ......................................................... 707/609
See application file for complete search history.

(56) References Cited

U.S. PATENT DOCUMENTS

| | | | |
|---|---|---|---|
| 5,806,065 | A | 9/1998 | Lomet |
| 6,792,432 | B1 | 9/2004 | Kodavalla et al. |
| 7,383,276 | B2 | 6/2008 | Lomet |
| 7,953,717 | B2 | 5/2011 | Graefe |
| 8,176,023 | B2 | 5/2012 | Graefe |

(Continued)

OTHER PUBLICATIONS

Benjamin-Deckert et al., U.S. Appl. No. 13/842,356, filed Mar. 15, 2013.

(Continued)

*Primary Examiner* — Jean M Corrielus
(74) *Attorney, Agent, or Firm* — Zilka-Kotab, P.C.

(57) ABSTRACT

In one embodiment, a method includes determining a data node corresponding to a data record to be inserted/updated in an index structure of a record-oriented file system, creating a lock on a corresponding data node, splitting the corresponding data node sequentially into two data nodes and storing the data record in one of the two data nodes in response to the corresponding data node not having free space sufficient to store/update the data record, storing a high key of the first of the two data nodes to a parent index node, splitting the parent index node sequentially into two index nodes in response to the parent index node not having free space sufficient to store/update the high key of the first of the two data nodes, and storing the high key of the first of the two data nodes in one of the two index nodes.

18 Claims, 7 Drawing Sheets

(56) References Cited

U.S. PATENT DOCUMENTS

| | | | |
|---|---|---|---|
| 8,868,531 B2* | 10/2014 | Majnemer | G06F 17/30327 |
| | | | 707/704 |
| 9,361,332 B2 | 6/2016 | Benjamin-Deckert et al. | |
| 2004/0107186 A1* | 6/2004 | Najork | G06F 17/30958 |
| 2005/0171960 A1 | 8/2005 | Lomet | |
| 2006/0179086 A1 | 8/2006 | Najork et al. | |
| 2007/0088769 A1* | 4/2007 | Pace | G06F 17/30067 |
| 2008/0071809 A1* | 3/2008 | Lomet | G06F 17/30327 |
| 2008/0086470 A1 | 4/2008 | Graefe | |
| 2009/0271408 A1* | 10/2009 | Graefe | G06F 17/30362 |
| 2012/0221531 A1* | 8/2012 | Liedes | G06F 17/30348 |
| | | | 707/687 |
| 2014/0074841 A1* | 3/2014 | Majnemer | G06F 17/30327 |
| | | | 707/737 |
| 2014/0279859 A1 | 9/2014 | Benjamin-Deckert et al. | |
| 2014/0310317 A1 | 10/2014 | Spillane et al. | |

OTHER PUBLICATIONS

Non-Final Office Action from U.S. Appl. No. 13/482,356, dated Nov. 10, 2015.

Notice of Allowance from U.S. Appl. No. 13/842,356, dated Mar. 15, 2016.

* cited by examiner

INDEX RECORD-LEVEL LOCKING FOR RECORD-ORIENTED FILE SYSTEMS

BACKGROUND

The present invention relates to data center management and file systems, and more specifically, this invention relates to locking at the index level of a record-oriented file system to ensure data integrity when performing operations to data records.

File systems which allow direct and sequential accesses to data stored therein typically utilize a B+ tree structure which is a variation of the basic B tree structure with all terminal nodes thereof containing data records. The non-terminal nodes of the B+ tree structure are referred to as an index structure. The top of the B+ tree structure is a single node referred to as the root. The B+ tree structure is a balanced tree with all the terminal nodes at the same level such that all data records stored therein have the same or substantially the same search length. The effectiveness and the popularity of the B+ tree structure may be attributable to the shape of the tree. The B+ tree tends to be short and wide, referred to typically as "flat," e.g., it has few hierarchical levels and many nodes at each level.

The B+ tree structure has become somewhat of a standard for organization of files. Many database systems (relational or otherwise) and general-purpose access methods, such as virtual storage access method (VSAM), are designed using the B+ tree structure. The VSAM includes some additional features over other typical access methods, such as key compression. For ease of discussion, and due to the fact that VSAM was one of the first commercial products in the world that used the B+ tree structure, VSAM terminology may be used in the descriptions provided, but the descriptions are not limited to VSAM alone, as any access method may be used in relation to a B+ tree structure.

The index structure of a B+ tree, such as a VSAM key-sequenced data set (KSDS), includes two parts, the 'sequence set' and the 'index set.' The terminal nodes of the B+ tree structure are keyed data records which are organized into one or more control intervals (CIs). Above the CIs are one or more control areas (CAs), with each CA being capable of organizing a plurality of CIs. Each node in the index is an index CI.

To ensure data integrity during parallel access, any searches, updates, and insertions of data records in a B+ tree are conducted in a serialized manner, commonly with the aid of locks or locking mechanisms. The choice of the level of serialization, e.g., at the key level, the record level, the index level, or the data set level, directly influences the functional and performance characteristics of the file system. For instance, if all record insertions are serialized on a data set level by locking up the entire data set for each insertion request, the performance would certainly be far worse than locking only the inserted record. However, locking only the inserted data record will not achieve data integrity if the insertion causes a CA split, because the split modifies one or more index nodes.

Currently the known solutions for file systems using a B+ tree structure, including VSAM, to handle performance problems related to splits on B+ trees typically lock at the record level for the insertion of a data record and, if a split occurs, a lock at the data set level is also obtained. Locking of the entire data set for splits creates incredible performance problems, as it single-threads all split processing operations against the locked data set. This has forced users of file systems using a B+ tree structure to devise a plethora of schemes to minimize splits, with some of the schemes creating other adverse performance issues.

SUMMARY

In one embodiment, a system includes a processor and logic integrated with and/or executable by the processor. The logic is configured to cause the processor to determine a data node corresponding to a data record to be inserted and/or updated in an index structure of a record-oriented file system. The logic also causes the processor to create a lock on the corresponding data node. Moreover, in response to a determination that the corresponding data node does not have free space sufficient to store and/or update the data record, the logic causes the processor to split the corresponding data node sequentially into two data nodes, store the data record in one of the two data nodes, and store a high key of the first of the two data nodes to a parent index node prior to a high key of the corresponding data node in response to a determination that the parent index node comprises free space sufficient to store the high key of the first of the two data nodes. The logic also causes the processor to, in response to a determination that the parent index node does not have free space sufficient to store and/or update the high key of the first of the two data nodes: split the parent index node sequentially into two index nodes, and store the high key of the first of the two data nodes in one of the two index nodes.

In another embodiment, a computer program product includes a computer readable storage medium that is not a transitory signal per se. The computer readable storage medium has program instructions embodied therewith. The program instructions are readable/executable by a processor to cause the processor to determine, using the processor, a data node corresponding to a data record to be inserted and/or updated in an index structure of a record-oriented file system. The program instructions are also readable/executable by the processor to create, using the processor, a lock on the corresponding data node. In response to a determination that the corresponding data node does not have free space sufficient to store and/or update the data record, the program instructions cause the processor to split, using the processor, the corresponding data node sequentially into two data nodes, store, using the processor, the data record in one of the two data nodes, and store, using the processor, a high key of the first of the two data nodes to a parent index node prior to a high key of the corresponding data node in response to a determination that the parent index node comprises free space sufficient to store the high key of the first of the two data nodes. The program instructions are also readable/executable to cause the processor to, in response to a determination that the parent index node does not have free space sufficient to store and/or update the high key of the first of the two data nodes: split, using the processor, the parent index node sequentially into two index nodes, and store, using the processor, the high key of the first of the two data nodes in one of the two index nodes.

According to another embodiment, a method includes determining a data node corresponding to a data record to be inserted and/or updated in an index structure of a record-oriented file system. The method also includes creating a lock on a corresponding data node. Moreover, the method includes, in response to a determination that the corresponding data node does not have free space sufficient to store and/or update the data record: splitting the corresponding data node sequentially into two data nodes, storing the data record in one of the two data nodes, and storing a high key of the first of the two data nodes to a parent index node prior to a high key of the corresponding data node in response to a determination that the parent index node comprises free space sufficient to store the high key of the first of the two data nodes. The method further includes, in response to a determination that the parent index node does not have free space sufficient to store and/or update the high key of the first of the two data nodes: splitting the parent index node sequentially into two index nodes, and storing the high key of the first of the two data nodes in one of the two index nodes.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

At a high level, the following description discloses several preferred embodiments of systems, methods, and computer program products for index record-level locking in a record-oriented file system. For example, splits at the index level are serialized by locking only the index nodes involved in the split, so that other splits on the data set not involving those index nodes may be performed concurrently. The readers of the split data node also do not have to wait as long as they would using conventional systems, because there is less contention for locks at the index level.

In one general embodiment, a system includes a processor and logic integrated with and/or executable by the processor, the logic being adapted to determine a data node corresponding to a data record to be inserted and/or updated in an index structure of a record-oriented file system, create a lock on the corresponding data node, store and/or update the data record in the corresponding data node when the corresponding data node includes free space sufficient to store and/or update the data record, and split the corresponding data node sequentially into two data nodes, store the new data record in one of the two data nodes, and create a lock on and update a parent node in a sequence set which includes information about the corresponding data node and any parent index nodes above the parent index node which are affected by a split of the parent index node when the corresponding data node does not have free space sufficient to store and/or update the data record.

In another general embodiment, a computer program product for adding and/or updating a data record includes a computer readable storage medium having program code embodied therewith, the program code readable/executable by a processor to determine, using the processor, a data node corresponding to a data record to be inserted and/or updated in an index structure of a record-oriented file system, create, using the processor, a lock on the corresponding data node, store and/or update, using the processor, the data record in the corresponding data node when the corresponding data node includes free space sufficient to store and/or update the data record, and split, using the processor, the corresponding data node sequentially into two data nodes, store the new data record in one of the two data nodes, and create a lock on and updating a parent node in a sequence set which includes information about the corresponding data node and any parent index nodes above the parent index node which are affected by a split of the parent index node when the corresponding data node does not have free space sufficient to store and/or update the data record.

According to another general embodiment, a method for adding a new data record to a file system includes determining a place to insert a new data record in an index structure of a record-oriented file system, creating a lock on a corresponding data node, storing the new data record in the corresponding data node when the corresponding data node includes free space sufficient to store the new data record, and—when the corresponding data node does not have free space sufficient to store the new data record—splitting the corresponding data node sequentially into two data nodes, storing the new data record in one of the two data nodes, determining a high key of a first of the two data nodes, creating a lock on a parent index node in a sequence set which includes information about the corresponding data node, storing the high key of the first of the two data nodes to the parent index node prior to a high key of the corresponding data node when the parent index node includes free space sufficient to store the high key of the first of the two data nodes, and—when the parent index node does not have free space sufficient to store the high key of the first of the two data nodes—creating a lock on any affected index nodes above the parent index node which are affected by a split of the parent index node, splitting the parent index node sequentially into two index nodes, and storing the high key of the first of the two data nodes in one of the two index nodes.

In yet another general embodiment, a method for adding and/or updating a data record includes determining a data node corresponding to a data record to be inserted and/or updated in an index structure of a record-oriented file system, creating a lock on the corresponding data node, storing and/or updating the data record in the corresponding data node when the corresponding data node includes free space sufficient to store and/or update the data record, and splitting the corresponding data node sequentially into two data nodes, storing the new data record in one of the two data nodes, and creating a lock on and updating a parent node in a sequence set which includes information about the corresponding data node and any parent index nodes above the parent index node which are affected by a split of the parent index node when the corresponding data node does not have free space sufficient to store and/or update the data record.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
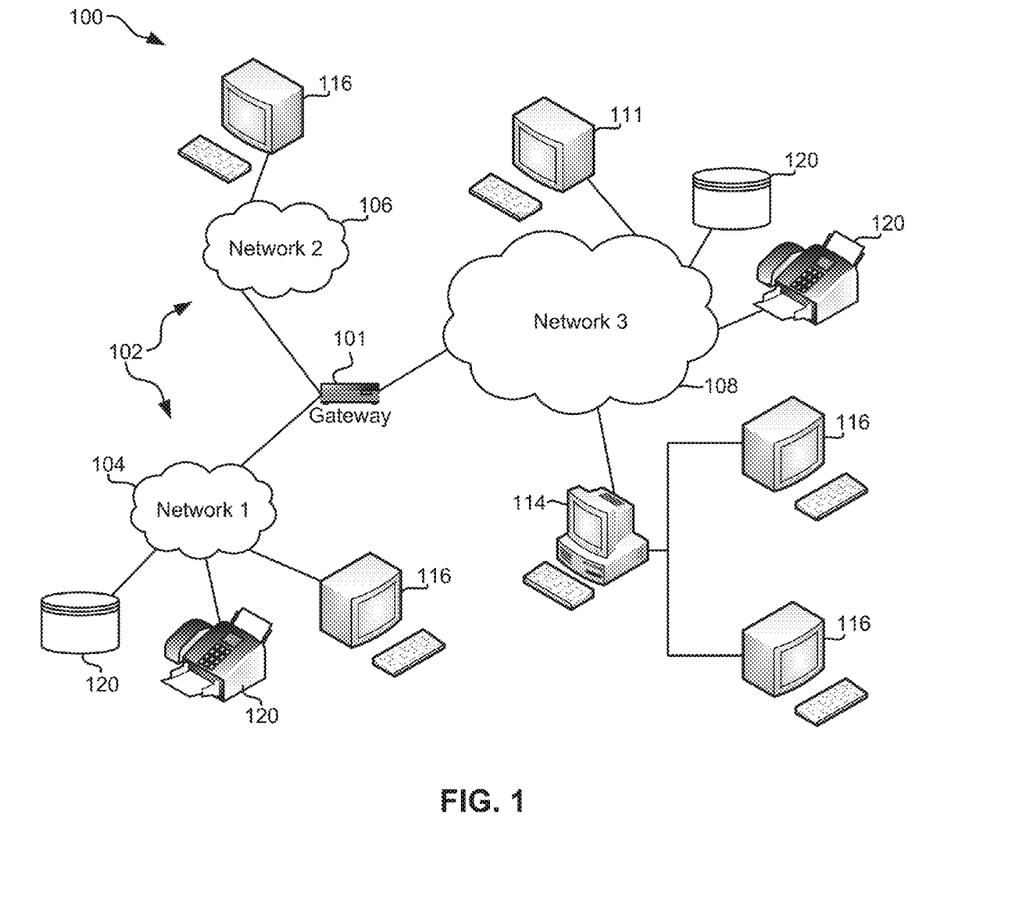
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
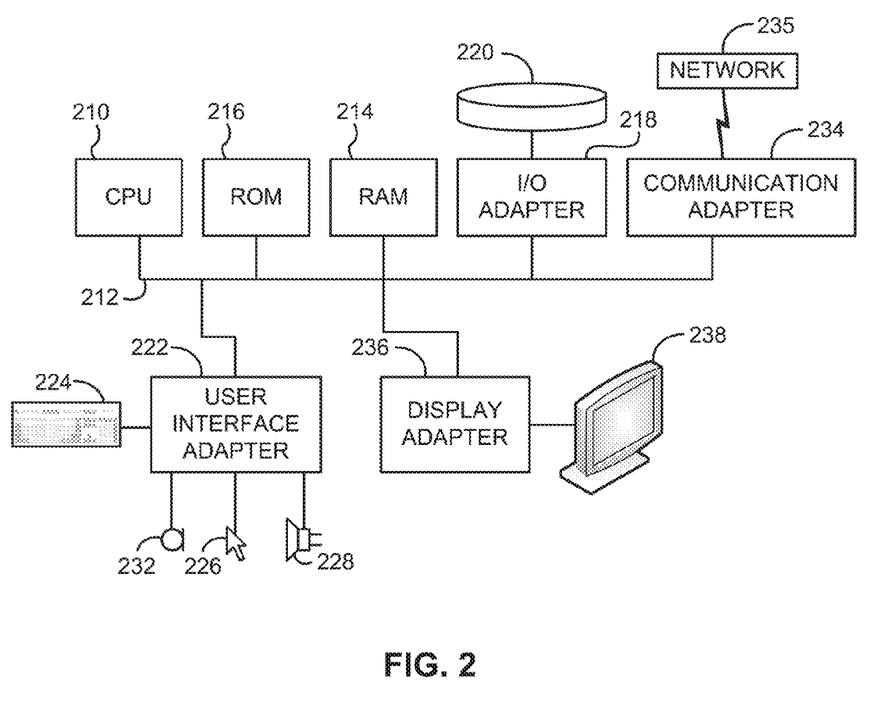
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
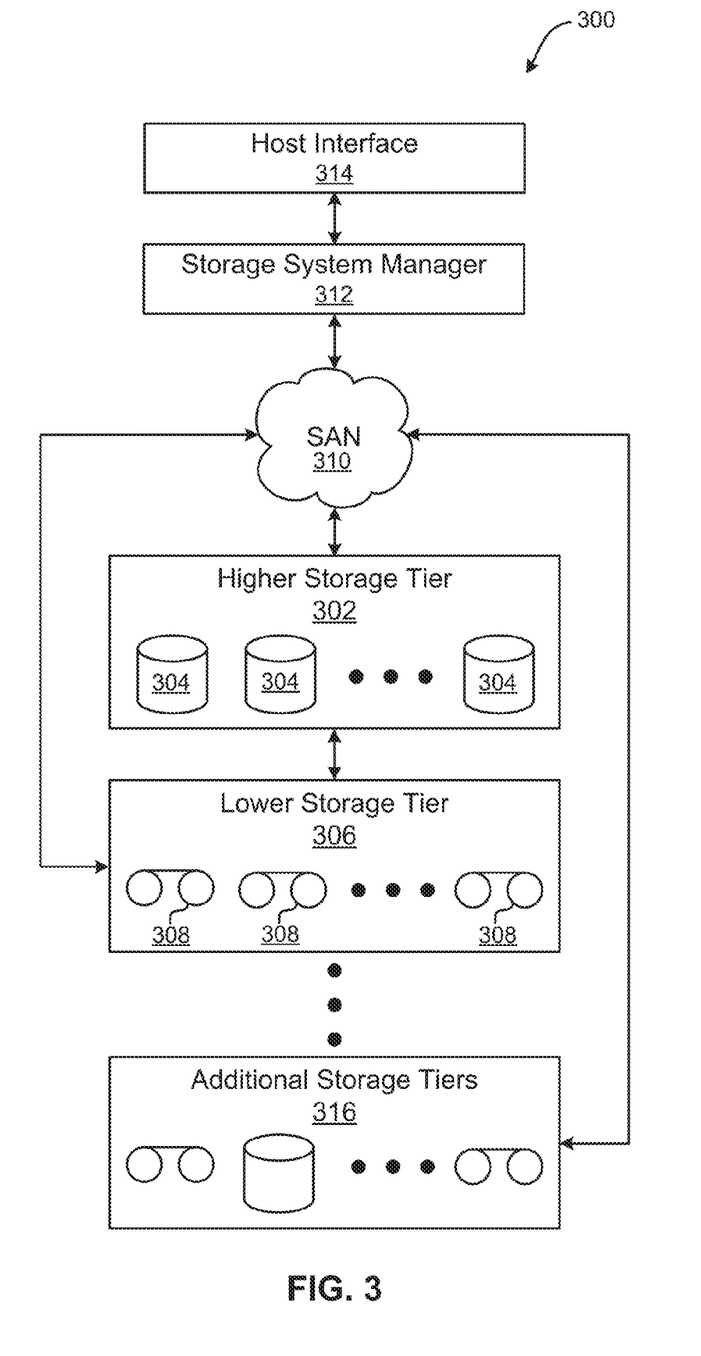
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

For ease of discussion, and due to the fact that virtual storage access method (VSAM) was one of the first commercial products in the world that used the B+ tree structure, VSAM terminology may be used in the descriptions provided herein. However, the embodiments described herein are not limited to a system which uses VSAM, as any record-oriented file system, such as a B+ tree, key sequenced data set (KSDS), entry sequenced data set (ESDS), relative record data set (RRDS), variable-length RRDS (VRRDS), etc., may be used with any of the embodiments described herein. The file system may or may not utilize a nonlinear data set structure.

Figure 4A:
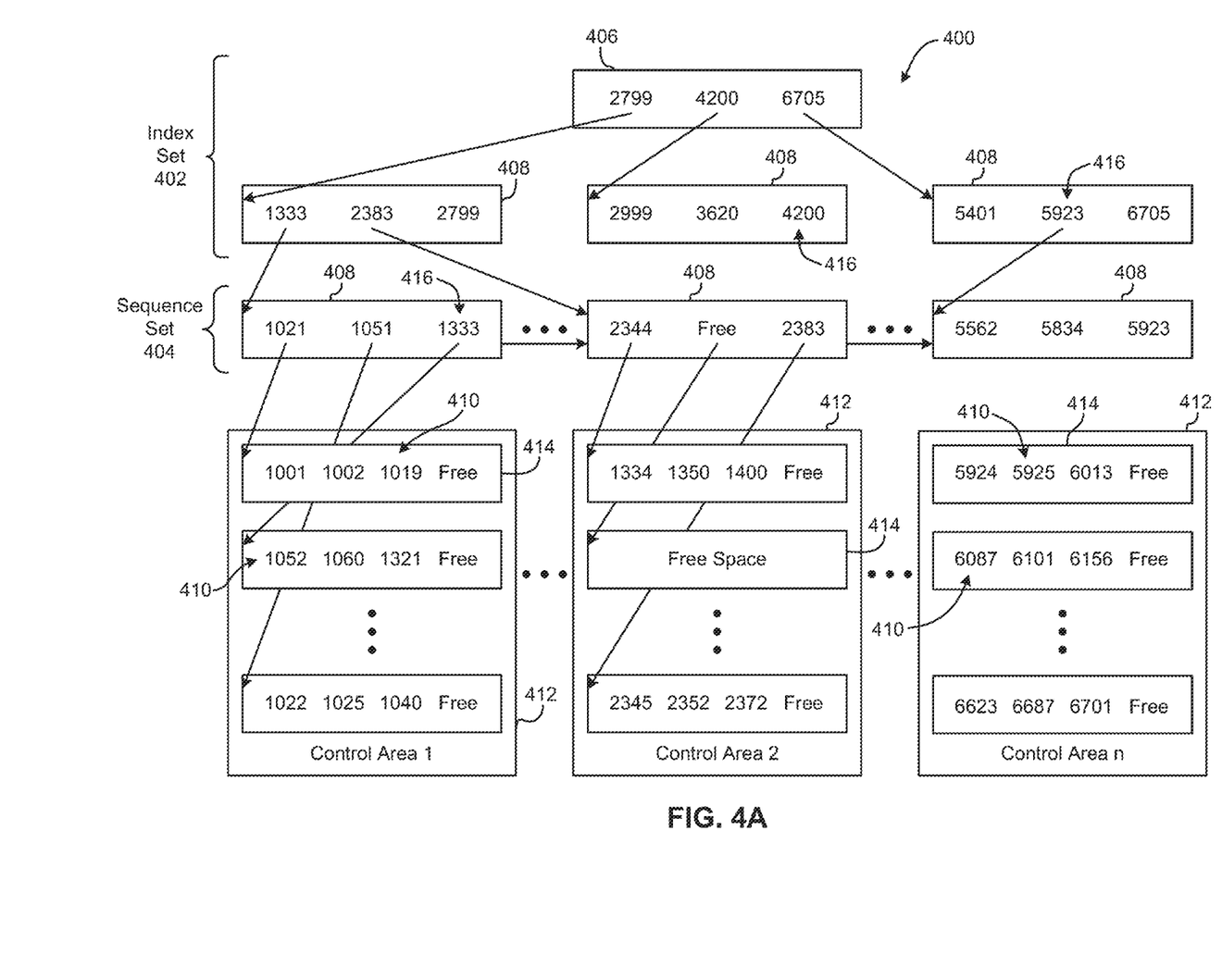
FIG. 4A illustrates a file structure in accordance with one embodiment.

A file structure of a data set 400 is shown in FIG. 4A which includes two parts, the 'sequence set' 404 and the 'index set' 402. The index set 402 includes the root 406, along with a plurality of index nodes 408. The terminal nodes of the file structure of the data set 400 are keyed data records 410 which are organized into one or more data control intervals (CIs) 414. Above the data CIs 414 are one or more data control areas (CAs) 412, with each data CA 412 being capable of organizing a plurality of data CIs 414. Each node 408 in the index set 402 is an index CI, which includes one or more index records 416.

In the file structure of the exemplary data set 400 shown in FIG. 4A, each data CA 412 includes three data CIs 414, but any number may be included according to storage and search requirements of a particular user of the file system. In addition, as shown in FIG. 4A, each data CIs 414 includes three data records 410, but any number may be included according to storage and search requirements of a particular user of the file system.

Figure 4B:
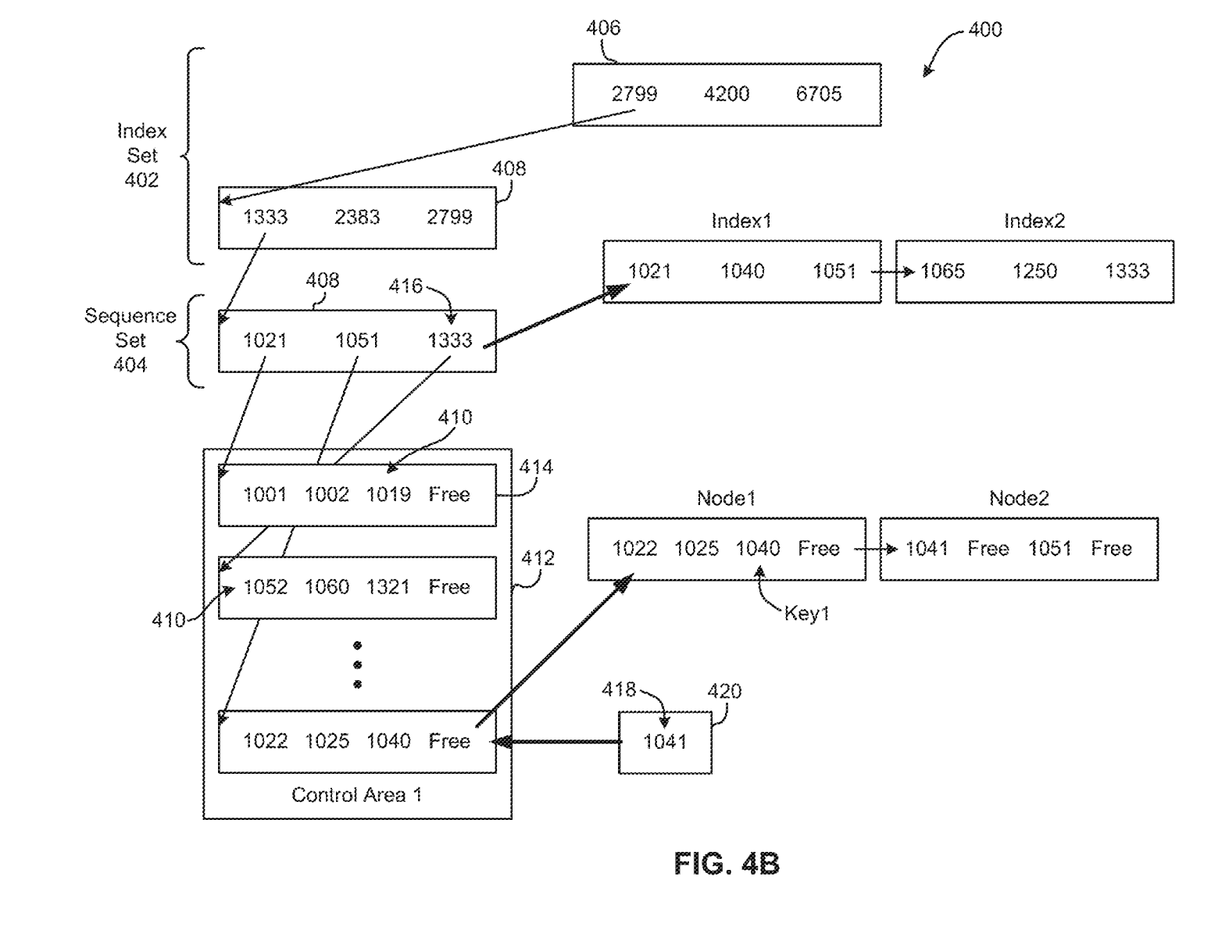
FIG. 4B shows a data record being inserted and/or updated in a file structure in accordance with one embodiment.

Referring now to FIG. 4B, according to one embodiment, an algorithm to directly insert a new data record 420 into the file structure of the data set 400 may include finding a node in the index structure by traversing from the root 406 down. First, free space suitable for the new data record 420 to be inserted is found within the data node (data CI 404). In order to perform this step, a key 418 (for example, key 1041) of the new data record 420 to be inserted is compared with a high key of the data records 410 in the individual CIs 414, which are stored in the sequence set 404. When a high key that is higher than the key 418 for the new data record 420 is found in a CI 414, then the proper node has been found to insert the new data record 420.

When the new data record 420 to be inserted fits into free space in the selected data node, the new data record 420 is placed in the node and the method is ended. Otherwise, the data node is split into two nodes (designated as Node1 and Node2 in FIG. 4B), which is referred to as a CI split, and the new data record 420 is placed into one of the two nodes, either Node1 or Node2, but not both. The high key of Node1 (Key1) is set aside to be moved to the parent index node in the sequence set 404. When there is no parent index node in the sequence set 404, then a new root node is created with pointers added to the split nodes (Node1 and Node2). Otherwise, Key1 is inserted into the parent index node in the sequence set 404, but when that index node is also full, it is split, which is referred to as a CA split, and the split operation is repeated to grow the tree upward as needed. A CA split may cause updates to all levels in the index structure (which includes the sequence set 404 and the index set 402).

According to one embodiment, the various splits that may occur during new data record writing and/or data record modifying may be set at the index level 402 by locking only the particular index nodes involved in the split, such that other splits on the data set not involving those index nodes may be carried out concurrently. In addition, the readers of the split data node would also not have to wait as long to access data records as a typical locking mechanism because there is less contention for locks at the index level than there are at the typical data set level.

To maintain data integrity, when a data record 410 insertion or update request is processed, the data record 410 is locked, similar to typical operation. However, when the request causes a split of a CI 414 or a CA 412, instead of exclusively locking the entire data set 400, as is typically done, only the index nodes involved in the split are locked. For a CI split that does not split a node of the sequence set 404, locking only the sequence-set node involved allows for other CI splits, not involving that node, to process concurrently. Since the majority of the nodes of a record-oriented file system are in the sequence set 404, many CI splits may take place at the same time. That alone is a huge performance improvement to split-heavy applications that are typically burdening file systems.

When a CI split causes a CA split, the parent index nodes that need to be split are also locked as the CA split processing goes up in the record-oriented file system. Other CA splits that do not involve those affected nodes may be processed concurrently with the data record insertion/modification, an additional gain in performance. Since the splits will complete more quickly, the data record insertions and updates that cause those splits are completed sooner.

In addition, some benefit may be derived by the readers. When the readers encounter (read) a data node that is involved in a split, the time that the readers must wait for the completion of the split will be lessened as compared to conventional methods because there will be less lock contention on the individual index nodes than would be encountered using a typical lock on the entire data set. Since the record insertion and update requests that involve split complete sooner, the readers will be able to find the up-to-date data records more quickly.

In addition, there are other reasons for updating an index record 416, for which a lock on an index node 408 and a data record 410 may be obtained. For example, a data record 410 may be locked when the data record 410 is to be erased. In another example, space may be reclaimed from the data set 400, when the last data record 410 is removed from a CI 414, thereby freeing up space.

According to another embodiment, when inserting or deleting data records 410 which span more than one CI 414 (spanned records), a lock may be obtained for each affected index record 416 along with affected data records 410. Although these specific examples are not described in the Figures, they may also result in a lock being obtained on an index node 408, and the same procedures described herein for data record 410 insertion may apply to these situations.

Figure 5:
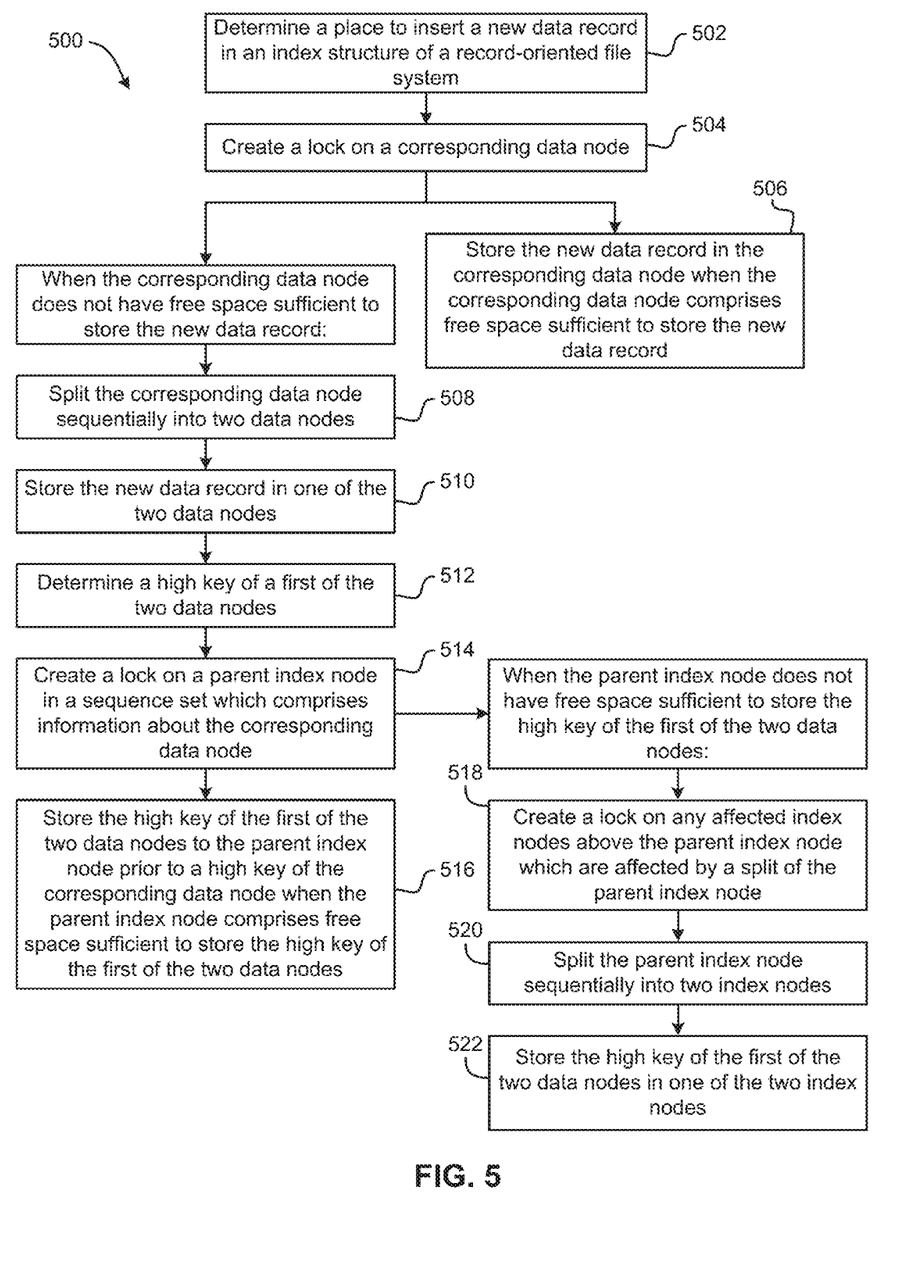
FIG. 5 shows a flowchart of a method according to one embodiment.

Now referring to FIG. 5, a flowchart of a method 500 for adding a new data record to a file system is shown, according to one embodiment. The method 500 may be performed in accordance with the present invention in any of the environments depicted in FIGS. 1-4B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a data storage system, a file system controller, a tiered data storage system controller, a processor (such as a CPU, an ASIC, an FPGA, etc.), a server, etc., or any other suitable device or component of a data storage system.

As shown in FIG. 5, method 500 may initiate with operation 502, where a place to insert a new data record in an index structure of a record-oriented file system is determined. The file system may be a VSAM system, with a CI comprising one or more data nodes, and a CA comprising one or more index nodes. Of course, other types of record-oriented file systems may be used, such as a B+ tree structure, ESDS, KSDS, nonlinear data structures, etc.

According to one embodiment, the place to insert the new data record in the index structure of the file system is determined by traversing from a root of the index structure down to a corresponding data node.

In another embodiment, the place to insert the new data record in the index structure of the file system may be determined by: determining a key for the new data record; determining the corresponding data node which has a high key that is higher than the new data record's key, with the proviso that a previously adjacent data node to the corresponding data node has a high key which is lower than the new data record's key, and selecting the corresponding data node as comprising the place to insert the new data record.

In operation 504, a lock is created on the corresponding data node, through any locking mechanism known in the art.

In operation 506, the new data record is stored in the corresponding data node when the corresponding data node comprises free space sufficient to store the new data record. That is, if there is space to store the new data record, then it is stored therein.

However, when the corresponding data node does not have free space sufficient to store the new data record, in operation 508, the corresponding data node is sequentially split into two data nodes.

Then, in operation 510, the new data record is stored in one of the two data nodes, whichever has space to store the new data record. It does not matter which data node is used to store the new data record.

In operation 512, a high key of a first of the two data nodes is determined. The high key of the second data node is already stored as the high key of the corresponding data node.

In operation 514, a lock is created on a parent index node in a sequence set which comprises information about the corresponding data node. Any known locking mechanism may be used to achieve the lock, as known in the art.

In operation 516, the high key of the first of the two data nodes is stored to the parent index node prior to the high key of the corresponding data node when the parent index node comprises free space sufficient to store the high key of the first of the two data nodes.

However, when the parent index node does not have free space sufficient to store the high key of the first of the two data nodes, in operation 518, a lock is created on any and all affected index nodes above the parent index node which are affected by a split of the parent index node. These affected index nodes include any splits in index CIs, index CAs, etc., above the current index node.

In operation 520, the parent index node is sequentially split into two index nodes. In this way, the parent index node, and all index records referenced therein, are split in sequential order to form two index nodes, the first pointing to the second.

In operation 522, the high key of the first of the two data nodes is stored in one of the two index nodes, usually the first index node in sequential order.

According to one embodiment, the method 500 may further comprise relinquishing the lock on the affected index nodes above the parent index node after updating the affected pointers therein, and relinquishing the lock on the corresponding data node after storing the new data record.

Figure 6:
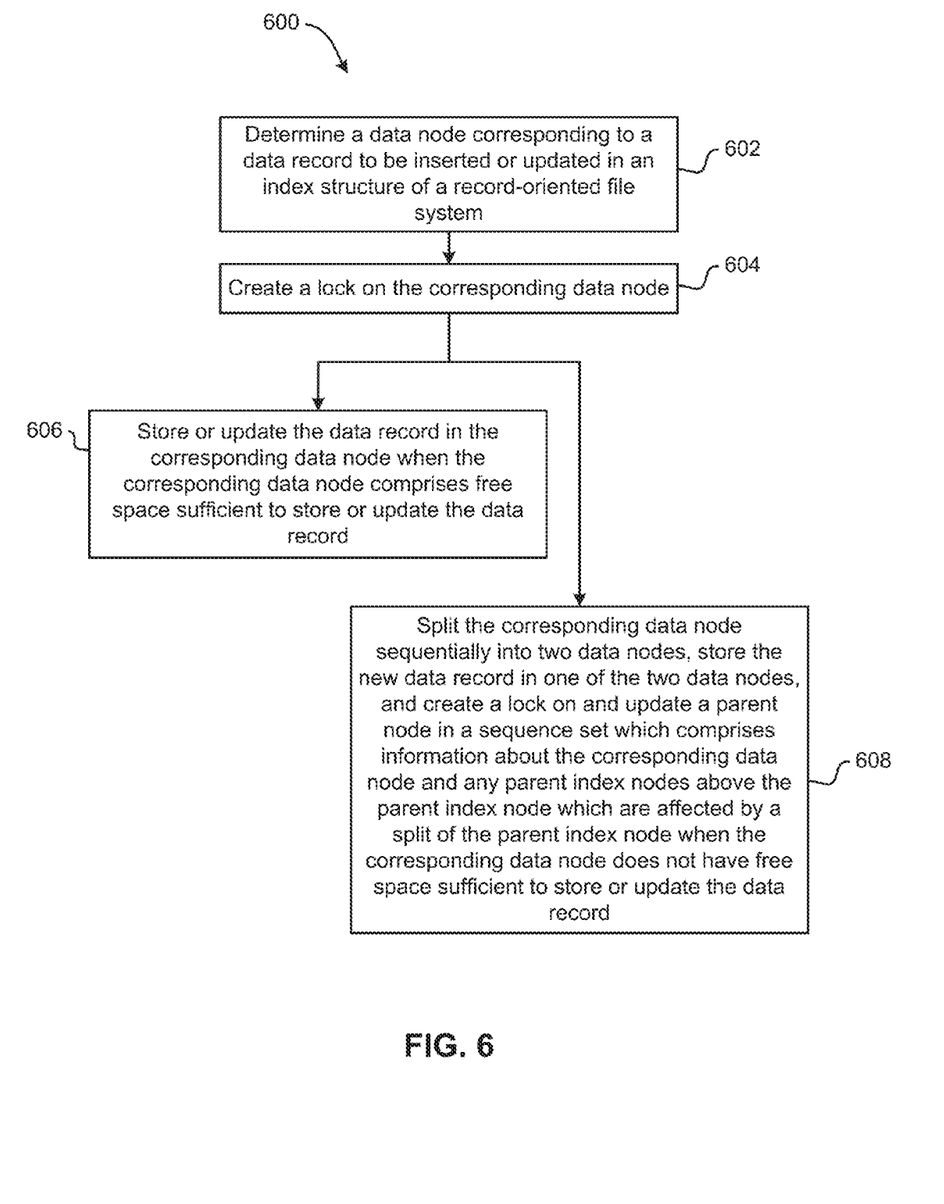
FIG. 6 shows a flowchart of a method according to one embodiment.

Now referring to FIG. 6, a flowchart of a method 600 for adding or updating a data record is shown, according to one embodiment. The method 600 may be performed in accordance with the present invention in any of the environments depicted in FIGS. 1-4B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a data storage system, a file system controller, a tiered data storage system controller, a processor (such as a CPU, an ASIC, an FPGA, etc.), a server, etc., or any other suitable device or component of a data storage system.

As shown in FIG. 6, method 600 may initiate with operation 602, where a data node corresponding to a data record to be inserted or updated in an index structure of a record-oriented file system is determined. The file system may be a VSAM system, with a CI comprising one or more data nodes, and a CA comprising one or more index nodes.

In another embodiment, the place to insert the new data record in the index structure of the file system may be determined by: determining a key for the new data record; determining the corresponding data node which has a high key that is higher than the new data record's key, with the proviso that a previously adjacent data node to the corresponding data node has a high key which is lower than the new data record's key, and selecting the corresponding data node as comprising the place to insert the new data record.

In operation 604, a lock is created on the corresponding data node, through any locking mechanism known in the art.

In operation 606, the data record in the corresponding data node is stored or updated when the corresponding data node comprises free space sufficient to store or update the data record.

Otherwise, in operation 608, the corresponding data node is sequentially split into two data nodes, the new data record is stored in one of the two data nodes, and a lock is created on and an update is performed on a parent node in a sequence set which comprises information about the corresponding data node and any parent index nodes above the parent index node which are affected by a split of the parent index node when the corresponding data node does not have free space sufficient to store or update the data record.

According to another embodiment, a method for providing index record-level locking comprises determining one or more data nodes corresponding to a specified data record or range of data records in an index structure of a record-oriented file system, creating a lock on the corresponding one or more data nodes, creating a lock on (and possibly updating) one or more parent nodes in a sequence set which comprises information about the corresponding one or more data nodes and any parent index nodes above the parent index node which are affected by updates to the parent index node, and acting on the specified data record or range of data records in the corresponding one or more data nodes, wherein acting may comprise inserting a new data record, updating or deleting an existing data record, freeing up space within one or more data CIs, moving, altering, or otherwise manipulating an existing data record, or any other act which may be performed on a data record or may cause a parent node having one or more index records to be updated as a result of the act.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a processor; and
    logic integrated with and/or executable by the processor, the logic being configured to cause the processor to:
        determine a data node corresponding to a data record to insert and update in an index structure of a record-oriented file system;
        create a lock on the corresponding data node;
        in response to a determination that the corresponding data node does not have free space sufficient to store and update the data record:
            split the corresponding data node sequentially into two data nodes;
            store the data record in one of the two data nodes; and
            store a high key of a first of the two data nodes to a parent index node prior to a high key of the corresponding data node in response to a determination that the parent index node comprises free space sufficient to store the high key of the first of the two data nodes; and
        in response to a determination that the parent index node does not have free space sufficient to store and update the high key of the first of the two data nodes:
            split the parent index node and all index records referenced therein sequentially into two index nodes; and
            store the high key of the first of the two data nodes in one of the two index nodes maintaining a sequence of the index records referenced in the two index nodes.

2. The system as recited in claim 1, wherein the file system is a virtual storage access method (VSAM) system, wherein a control interval (CI) comprises data nodes, wherein a control area (CA) comprises index nodes, and wherein the logic is further configured to cause the processor to create a new root node having pointers to the two data nodes in response to a determination that there is no parent index node in a sequence set.

3. The system as recited in claim 1, wherein the logic is further configured to cause the processor to:
    store and update the data record in the corresponding data node in response to a determination that the corresponding data node comprises free space sufficient to store and update the data record after creating the lock on the corresponding data node;
    create a lock on and update the parent index node in a sequence set which comprises information about the corresponding data node prior to splitting the parent index node into the two index nodes;
    create a lock on any affected index nodes above the parent index node which are affected by the split of the parent index node;
    relinquish the lock on affected index nodes above the parent index node after updating affected pointers therein; and
    relinquish the lock on the corresponding data node after storing and updating the data record.

4. The system as recited in claim 1, wherein the corresponding data node is determined by traversing from a root of the index structure down to the corresponding data node.

5. The system as recited in claim 1, wherein the logic configured to determine the data node corresponding to the data record to be inserted and updated further causes the processor to:
    determine a key for the data record;
    determine the corresponding data node which has the high key that is higher than the data record's key, with a proviso that a previously adjacent data node to the corresponding data node has a high key which is lower than the data record's key; and
    select the corresponding data node.

6. The system as recited in claim 1, wherein the logic is further configured to cause the processor to determine the high key of the first of the two data nodes.

7. A computer program product comprising a computer readable storage medium having program instructions embodied therewith, wherein the computer readable storage medium is not a transitory signal per se, the embodied program instructions readable/executable by a processor to cause the processor to:
 determine, using the processor, a data node corresponding to a data record to insert and update in an index structure of a record-oriented file system;
 create, using the processor, a lock on the corresponding data node;
 in response to a determination that the corresponding data node does not have free space sufficient to store and update the data record:
  split, using the processor, the corresponding data node sequentially into two data nodes;
  store, using the processor, the data record in one of the two data nodes; and
  store, using the processor, a high key of a first of the two data nodes to a parent index node prior to a high key of the corresponding data node in response to a determination that the parent index node comprises free space sufficient to store the high key of the first of the two data nodes; and
 in response to a determination that the parent index node does not have free space sufficient to store and update the high key of the first of the two data nodes:
  split, using the processor, the parent index node and all index records referenced therein sequentially into two index nodes; and
  store, using the processor, the high key of the first of the two data nodes in one of the two index nodes maintaining a sequence of the index records referenced in the two index nodes.

8. The computer program product as recited in claim 7, wherein the file system is a virtual storage access method (VSAM) system, wherein a control interval (CI) comprises data nodes, wherein a control area (CA) comprises index nodes, and wherein the program instructions readable/executable by the processor are further configured to cause the processor to create, using the processor, a new root node having pointers to the two data nodes in response to a determination that there is no parent index node in a sequence set.

9. The computer program product as recited in claim 7, wherein the program instructions readable/executable by the processor are further configured to cause the processor to:
 store and update, using the processor, the data record in the corresponding data node in response to a determination that the corresponding data node comprises free space sufficient to store and update the data record after creating the lock on the corresponding data node;
 create, using the processor, a lock on and update the parent index node in a sequence set which comprises information about the corresponding data node prior to splitting the parent index node into the two index nodes;
 create, using the processor, a lock on any affected index nodes above the parent index node which are affected by the split of the parent index node;
 relinquish, using the processor, the lock on affected index nodes above the parent index node after updating affected pointers therein; and
 relinquish, using the processor, the lock on the corresponding data node after storing and updating the data record.

10. The computer program product as recited in claim 7, wherein the corresponding data node is determined by traversing from a root of the index structure down to the corresponding data node.

11. The computer program product as recited in claim 7, wherein the program instructions readable/executable by the processor to determine, using the processor, the data node corresponding to the data record to be inserted and updated further causes the processor to:
 determine, using the processor, a key for the data record;
 determine, using the processor, the corresponding data node which has a high key that is higher than the data record's key, with a proviso that a previously adjacent data node to the corresponding data node has a high key which is lower than the data record's key; and
 select, using the processor, the corresponding data node.

12. The computer program product as recited in claim 7, wherein the program instructions readable/executable by the processor are further configured to cause the processor to determine, using the processor, the high key of the first of the two data nodes.

13. A method, comprising:
 determining a data node corresponding to a data record to insert and update in an index structure of a record-oriented file system;
 creating a lock on a corresponding data node;
 in response to a determination that the corresponding data node does not have free space sufficient to store and update the data record:
  splitting the corresponding data node sequentially into two data nodes;
  storing the data record in one of the two data nodes; and
  storing a high key of a first of the two data nodes to a parent index node prior to a high key of the corresponding data node in response to a determination that the parent index node comprises free space sufficient to store the high key of the first of the two data nodes; and
 in response to a determination that the parent index node does not have free space sufficient to store and update the high key of the first of the two data nodes:
  splitting the parent index node and all index records referenced therein sequentially into two index nodes; and
  storing the high key of the first of the two data nodes in one of the two index nodes maintaining a sequence of the index records referenced in the two index nodes.

14. The method as recited in claim 13, wherein the file system is a virtual storage access method (VSAM) system, wherein a control interval (CI) comprises data nodes, wherein a control area (CA) comprises index nodes, and wherein the method further comprises creating a new root node having pointers to the two data nodes in response to a determination that there is no parent index node in a sequence set.

15. The method as recited in claim 13, further comprising:
 storing and updating the data record in the corresponding data node in response to a determination that the corresponding data node comprises free space sufficient to store and update the data record after creating the lock on the corresponding data node;
 creating a lock on and update the parent index node in a sequence set which comprises information about the corresponding data node prior to splitting the parent index node into the two index nodes;

creating a lock on any affected index nodes above the parent index node which are affected by the split of the parent index node;

relinquishing the lock on affected index nodes above the parent index node after updating affected pointers therein; and relinquishing the lock on the corresponding data node after storing and updating the data record.

16. The method as recited in claim 13, wherein the corresponding data node is determined by traversing from a root of the index structure down to the corresponding data node.

17. The method as recited in claim 13, wherein the determining the data node corresponding to the data record to be inserted and updated comprises:

determining a key for the data record;

determining the corresponding data node which has the high key that is higher than the data record's key, with a proviso that a previously adjacent data node to the corresponding data node has a high key which is lower than the data record's key; and selecting the corresponding data node.

18. The method as recited in claim 13, further comprising determining the high key of the first of the two data nodes.

* * * * *